R. FRANK.
FILTER OR STRAINER ATTACHMENT FOR FAUCETS.
APPLICATION FILED JAN. 24, 1920.
1,361,976.
Patented Dec. 14, 1920.
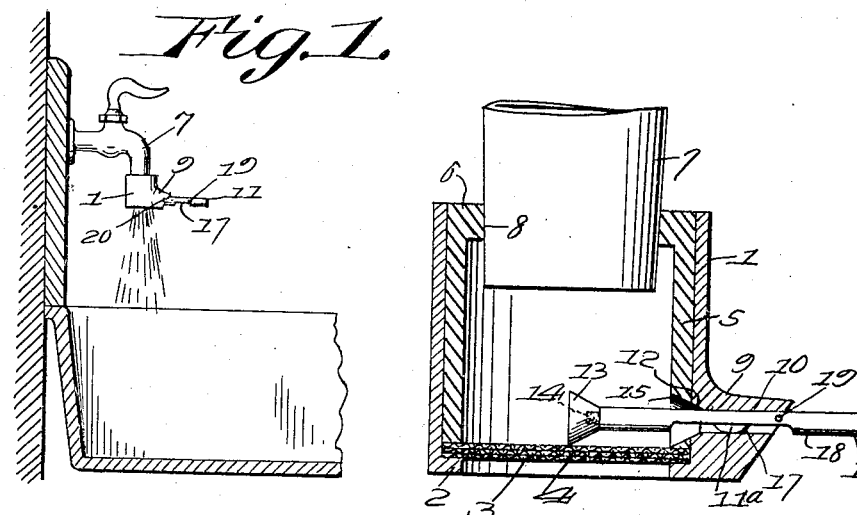
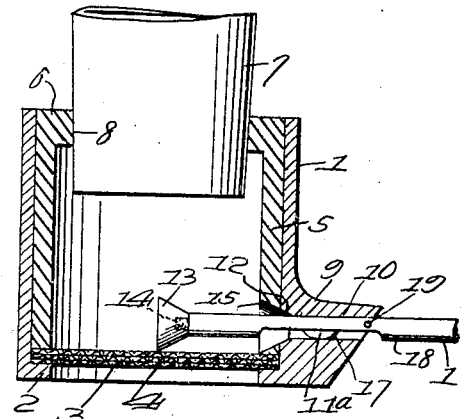
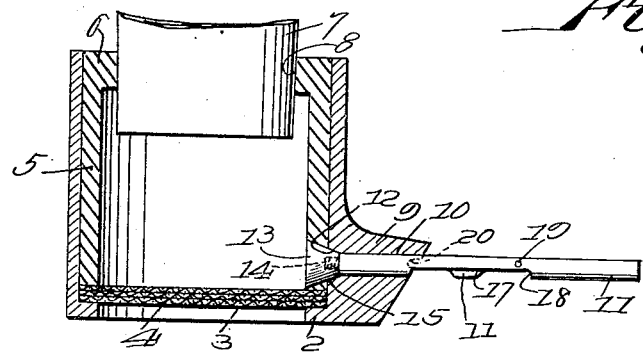
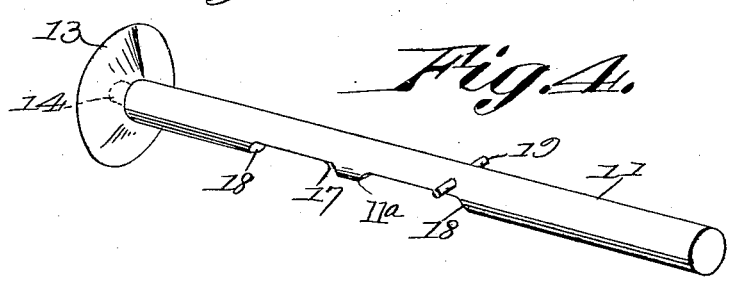
Inventor
Ralph Frank,
By Watson E. Coleman
Attorney

UNITED STATES PATENT OFFICE.

RALPH FRANK, OF MINNEAPOLIS, MINNESOTA.

FILTER OR STRAINER ATTACHMENT FOR FAUCETS.

1,361,976.   Specification of Letters Patent.   Patented Dec. 14, 1920.

Application filed January 24, 1920. Serial No. 353,686.

*To all whom it may concern:*

Be it known that I, RALPH FRANK, a citizen of the United States, residing at Minneapolis, in the county of Hennepin and State of Minnesota, have invented certain new and useful Improvements in Filter or Strainer Attachments for Faucets, of which the following is a specification, reference being had to the accompanying drawings.

This invention relates to an improved filter or strainer attachment for faucets and the like, and an object of the invention is to provide an improved, simple, efficient and practical device of this kind, capable of being manufactured for a relatively low cost, and sold at a reasonable profit.

In addition to affording an improved filter or strainer attachment for faucets, the invention primarily aims to provide means for carrying off the collection of refuse in the filter or strainer, without detaching the filter or strainer from the faucet, and to accomplish this aim, the force of the flow of water from the faucet into the filter or strainer casing is employed. In other words, the force of the stream of water into the casing of the filter drives the refuse from the upper surface of the filtering screens through a laterally disposed valve element, which is movably mounted in the wall of the casing of the filter. The refuse being carried off in this manner to the sink is washed through the drain pipe of the sink by the flow of the water from the faucet.

The present form of filter and the attachment, for relieving the casing of the filter of the refuse, can be readily employed in connection with the faucet without unnecessarily wasting a great amount of water, and it is to be noted that the short distance between the outlet end of the faucet and the filtering screens plays an essenial and most important part in causing the discharge of the refuse, for the reason that the force of the water at such a short distance does not give the refuse any chance to settle on the filtering screens, when the valve element is opened.

A still further object of the invention is to provide a self-cleaning adjustable filter, particularly adapted for home use, and which may be readily used on any kind of faucet in a position over the sink.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a vertical sectional view of a sink, and the self-cleaning adjustable filter as applied in elevation to the faucet, Fig. 2 is an enlarged sectional view through the filter or strainer constructed in accordance with the invention showing the faucet in elevation and illustrating the refuse carrying off means closed, Fig. 3 is a view similar to Fig. 2 showing the refuse carrying off means open, and Fig. 4 is a detail view of the valve which is adapted to be opened for permitting the escape of the refuse or sediment.

Referring more especially to the drawings, 1 designates the casing of the filter or strainer, which may be constructed of any suitable metal, preferably aluminum, or the like, and which may be any suitable shape, preferably as illustrated. This casing is shown as being cylindrical and slightly tapered, though it may be otherwise shaped, and it has at its lower end an internal annular flange 2 constituting a shoulder 3 for the support of a plurality of thicknesses or plies of wire fabric or screen material of a very fine mesh, as shown. These thicknesses or layers or plies of wire fabric or screen material 4 are superimposed, there being preferably five in number, though not necessarily, and to hold them firmly in contact with the shoulder, a pliable sleeve 5 is fitted into the casing. This pliable sleeve may be constructed of any suitable material, preferably rubber or the like, and may be held in the casing in any conventional manner, preferably by frictional contact with the wall of the casing. Very often in devices of this character, the sleeve is held in the casing by means of threads, though in the present application no such construction is illustrated. The upper end of the sleeve has an internal annular flange 6, which is of considerable thickness, sufficient to firmly contact with the cylindrical surface of the faucet 7, to which the filter or strainer is applied. The opening 8, caused to be formed by the provision of the flange 6 is preferably of a smaller diameter than the diameter of the casing of the faucet, thereby requiring a certain amount of pressure or force to cause the opening to fit or telescopically receive the faucet, and thereby causing the flange to frictionally hug the faucet to hold the casing of the filter to the faucet.

The casing 1 has an extension 9 provided with an opening 10, which receives a pin valve 11. The inner end of the opening 10 of the extension 9 adjacent the inner surface of the casing 1 has a beveled countersink 12. The pin valve has a valve head 13, which is beveled, and is adapted to seat in the beveled counter-sink 12, which constitutes a valve seat. While the valve head 13 is carried by the pin vale, it is to be noted that it is capable of being detached, the same being connected to the pin valve by means of the threaded extension 14. This threaded extension is caused to firmly engage into the pin valve by wedging or tightly fitting the threads, by applying considerable force to the valve head. The rubber sleeve which is mounted in the casing at a point adjacent the wire fabric filtering disks, is provided with an opening 15, the wall of which is beveled correspondingly to the valve and counter-sink or valve seat 12, and is adapted to be engaged by the valve head of the pin valve. When the pin valve is closed and the valve head is in contact with the countersink and the beveled opening, the force of the water into the casing of the filterer, aids materially in holding the valve head in contact with its seat, thereby preventing the escape of water during the filtering process. By means of the valve head contacting with the beveled opening of the rubber sleeve, a tight fit of the valve head is afforded.

The pin valve at a point substantially between its ends, is provided with an elongated cut away portion 17, and the part 17 of the pin valve, between the shoulders 18 at the opposite ends of the cut away portion is semi-circular in cross section. The pin valve is provided with a transverse dowel pin 19, which contacts with the end of the extension 9 to limit the inward movement of the pin valve, when it is in open position. The end of the extension 9 is provided with diametrically opposite semi-circular recesses 20 to receive the dowel pin, to prevent the pin valve from rotating when it is open, and to hold the pin valve so that its cut away portion will open downwardly, whereby the discharge of water together with the refuse will be in a downward direction rather than laterally or upwardly.

Ordinarily the pin valve is closed, and obviously whenever the valve cock of the faucet is opened, the water will flow through the casing 1 and be filtered or strained by the wire fabric disks. It has been found that quite a bit of sediment collects on the filtering or screen elements, therefore, the aim of the present invention is to provide suitable means to cause the removal of the sediment, hence the provision of the pin valve. During the usual filtering process of the water, as previously stated, the valve head of the pin valve is normally closed. However, when it is desired to cause the removal of the sediment, the pin valve may be moved inwardly unseating the valve head, and causing the transverse pin 19 to engage the semi-circular recesses 20, therefore, it will be observed that the cut away portion 17 will be positioned far enough inwardly of the casing 1 as to permit the force of the water to carry off the sediment through the opening 10, for the cut away portion 17 extends beyond the opening 10 at each end. In fact, the water will pass out through the cut away portion 17, and owing to the portion facing downward, the water and the sediment will be discharged in a downward direction into the sink.

When the pin valve is closed and the watre is allowed to pass from the faucet, by opening the valve cock, the non-purified water is prevented from passing through the filtering elements, and since the valve head makes a close joint with the valve seat, the sediment is prevented from escaping. As the sediment is repeatedly removed at various intervals, from the casing of the filter by opening the pin valve, it is obvious that a better and more purified water is obtained, as there is not very much sediment allowed to collect, therefore, the water will not accumulate the impurities by washing over or percolating through the sediment. This may be insured at all times, because before using the water which is filtered, the pin valve may be operated inwardly to permit the flow of the water to wash out the sediment heretofore collected, and then the pin valve can be closed, after which the properly filtered water is usable. In fact, if desired, the pin valve may be allowed to remain open, while the water which is being filtered is received in a container for use. In such an instance, the sediment as it collects when the water is allowed to flow, is automatically removed, owing to the pin valve being open. As there is not very much space between the lower end of the faucet and the uppermost filtering element, there is not very much chance for outside dirt to collect.

The pin valve 11 adjacent the cut away portion is provided with opposite flanges 11ª, there being a space between the flanges to engage the bottom of the opening 10, when the pin valve is open, thereby preventing the pin valve from sagging. When the pin valve is open, the valve head 13 will scrape over the upper face of the uppermost filtering member, thereby dislodging the sediment that may collect thereon.

The invention having been set forth, what is claimed as new and useful is:—

1. In a device for carrying off the refuse from a filter which is provided with a filtering member, the combination with a casing, the wall of which having a transverse outlet opening for the refuse, of means mounted in the opening for closing the same, said means having a device at one end engaging one end of said opening to additionally close the opening, said device adapted to move across the filtering member for dislodging the refuse, whereby it may be discharged through the opening when said means is open, said means having a cut away portion adapted to register with the wall of the opening when the means is open, to permit of the discharge of the refuse.

2. In a device for carrying off refuse from a filter, the combination with a casing including a filtering member, said casing having a lateral opening in its wall, means mounted in the opening adapted to close and open the same, said means having a device at one end for sliding over the surface of the filtering member for dislodging the refuse, whereby it may be carried off when the opening is open.

3. In a device for carrying off refuse, a filter, a casing provided with a lateral opening in its wall, one end of the opening having a valve seat, a valve engaging said seat, a stem provided in the opening, said stem having a cut away part adapted to register with the wall of the opening when the valve is pushed inwardly to permit of the discharge of the refuse from the casing, said valve adapted to scrape over the surface of a filtering member in the casing for dislodging the refuse to permit it to be carried off.

4. In a device for carrying off the refuse from a filter, a casing having an opening in its wall, one end of the opening having a valve seat, a valve operatively engaging said seat, a stem for the valve guided in the opening, the marginal edge of one end of the opening having notches, said stem having an elongated cut away portion registering with the wall of the opening, when the stem and valve are pushed inwardly to permit the discharge of the refuse, said valve adapted to scrape over the surface of the filtering member in the filter for dislodging the refuse to permit it to be carried off, and means carried by the stem to engage said notches to prevent rotation of the stem when the stem and valve are pushed inwardly.

In testimony whereof I hereunto affix my signature.

RALPH FRANK.